Sept. 29, 1959

A. A. C. DEGEN 2,906,583

RECORDING MACHINES

Filed April 26, 1955

11 Sheets-Sheet 1

INVENTOR
A. A. C. DEGEN
BY Young, Emery & Thompson
ATTYS.

Sept. 29, 1959 A. A. C. DEGEN 2,906,583

RECORDING MACHINES

Filed April 26, 1955 11 Sheets-Sheet 2

INVENTOR

A. A. C. DEGEN

By Young, Emery & Thompson

ATTYS.

Sept. 29, 1959

A. A. C. DEGEN 2,906,583

RECORDING MACHINES

Filed April 26, 1955

11 Sheets-Sheet 3

INVENTOR

A. A. C. DEGEN

By Young, Emery & Thompson

ATTYS.

Sept. 29, 1959 A. A. C. DEGEN 2,906,583

RECORDING MACHINES

Filed April 26, 1955 11 Sheets-Sheet 4

INVENTOR

A. A. C. DEGEN

By Young, Emery & Thompson

ATTYS.

Sept. 29, 1959 A. A. C. DEGEN 2,906,583

RECORDING MACHINES

Filed April 26, 1955 11 Sheets-Sheet 5

INVENTOR

A. A. C. DEGEN

By Young, Emery & Thompson

ATTYS.

INVENTOR
A. A. C. DEGEN
By Young, Emery & Thompson
ATTYS.

Sept. 29, 1959 A. A. C. DEGEN 2,906,583

RECORDING MACHINES

Filed April 26, 1955 11 Sheets-Sheet 7

INVENTOR
A. A. C. DEGEN
By Young, Emery & Thompson
ATTYS.

Sept. 29, 1959 A. A. C. DEGEN 2,906,583

RECORDING MACHINES

Filed April 26, 1955 11 Sheets-Sheet 8

INVENTOR

A. A. C. DEGEN

By Young, Emery & Thompson

ATTYS.

INVENTOR
A. A. C. DEGEN
By Young, Emery & Thompson
ATTYS.

Sept. 29, 1959

A. A. C. DEGEN 2,906,583

RECORDING MACHINES

Filed April 26, 1955

11 Sheets-Sheet 10

INVENTOR

A. A. C. DEGEN

By Young, Emery & Thompson

ATTYS.

Sept. 29, 1959

A. A. C. DEGEN 2,906,583

RECORDING MACHINES

Filed April 26, 1955

11 Sheets-Sheet 11

INVENTOR

A. A. C. DEGEN

By Young, Emery & Thompson

ATTYS

United States Patent Office 2,906,583

Patented Sept. 29, 1959

2,906,583

RECORDING MACHINES

Alexander Adolphus Carlo Degen, Harrow, England

Application April 26, 1955, Serial No. 504,067

Claims priority, application Great Britain April 28, 1954

8 Claims. (Cl. 346—94)

The invention relates to a machine for recording the value of a continuously changing variable on the occurrence of some "event." The variable may, for example, be time measured from a convenient datum or the readings of a continuously driven set of dials controlling the frequency of an electronic instrument and, in the latter case, the "event" may, for example, be the attainment of a specific frequency. In the preferred form of the machine the values of the variable on the occurrence of a succession of events may be recorded.

One object of the invention is to provide such a machine which is capable of operation at reasonably high speeds.

According to the invention a machine for the above purpose comprises a counter, continuously operable means for advancing the counter in accordance with changes in the variable, means operable on the occurrence of the "event" to record the counter reading, means for stopping the advance of the counter during the recording of the reading without stopping the advancing means, and means for "storing" the amount of operation of the advancing means corresponding to the changes in the variable during the stoppage of the counter and for advancing the counter by an amount equivalent to the stored operation at the end of the period of stoppage in addition to the amount of the normal advance of the counter in accordance with the changing variable.

The term "counter" is used herein in a broad sense to include not only a numerical counter operating on a decimal system but also any device which provides a progressive reading according to any convenient code.

The means for advancing the counter may include a rotatable driving member with a driving connection to the counter and the storage means may comprise an epicyclic gear train in the said driving connection, the train comprising an input member coupled to the driving member, an output member coupled to the counter and a reaction member normally held against rotation in a home position, means permitting rotation of the reaction member from the home position by the operation of the driving member during the stoppage of the counter and of the output member and means for returning the reaction member to the home position on release of the counter for further advancement, thereby to drive the output member and counter by an amount proportional to the rotation of the reaction member from the home position.

The means for returning the reaction member to the home position may comprise a driving connection from the driving member to the reaction member, said connection being additional to the drive through the output member and including a clutch capable of slip or release or both.

The reaction member, in one construction according to the invention, is located in its home position by interengagement of a rotatable locking arm therewith, the arm being rotatable out of such interengagement and having a gear drive from the reaction member whereby the extent of such rotation of the arm is proportional to the amount by which the reaction member is rotated from the home position.

Other features of preferred forms of the invention include means for locking the counter during recording, printing mechanism for printing the records and for advancing record material past the counter.

One specific construction of a recording machine according to the invention and some modifications thereof will now be described with reference to the accompanying drawings, in which.

Figure 5:
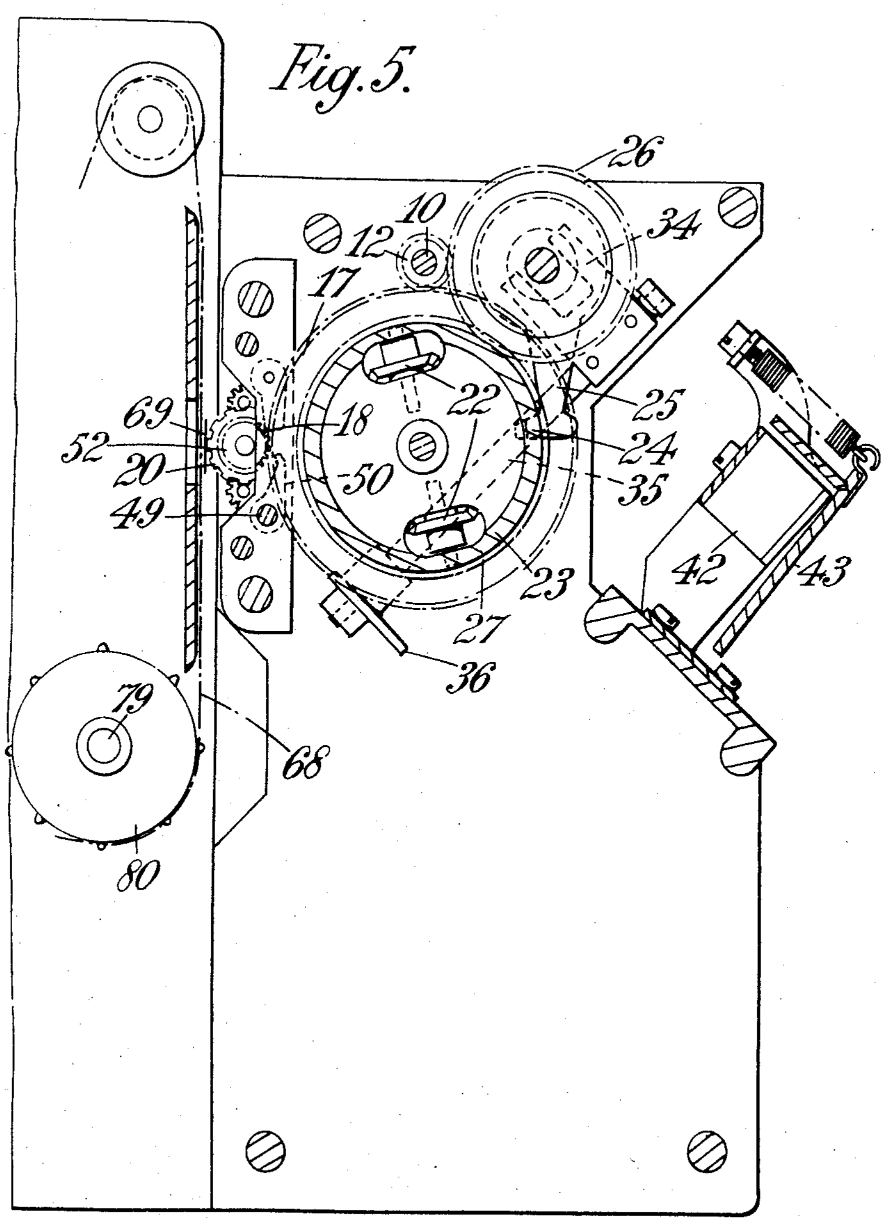
Figure 5 is a section on the line 5—5 in Figure 4.
Figure 6:
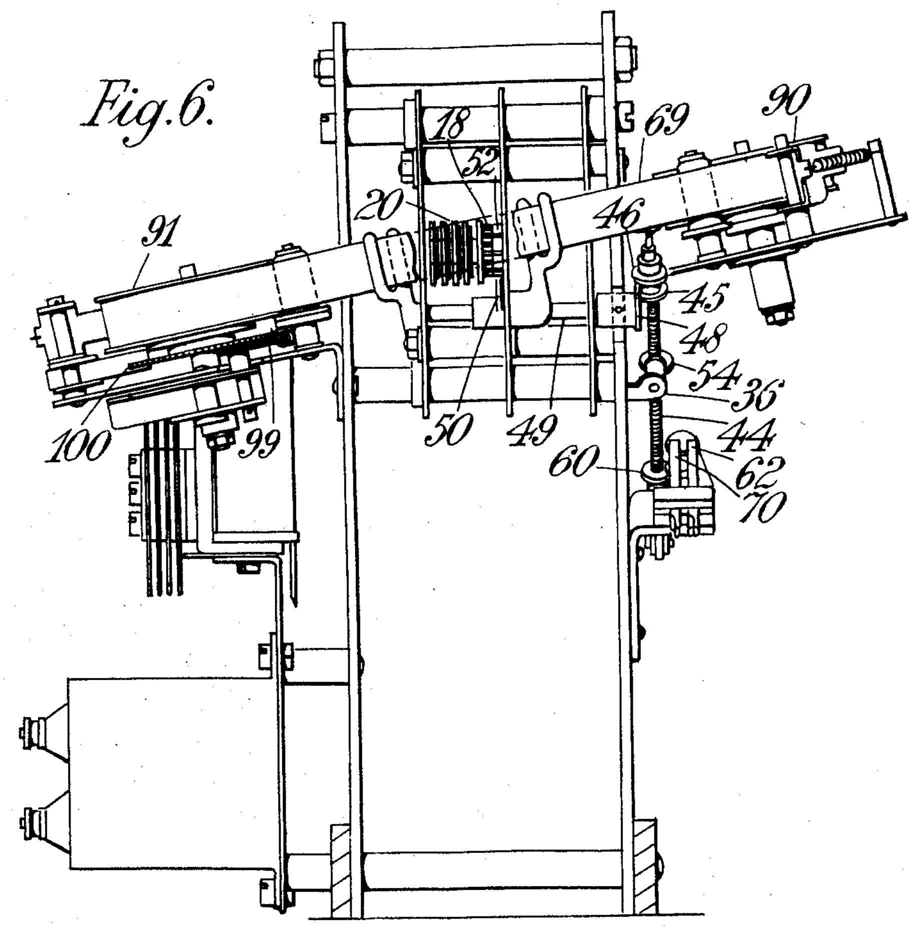
Figure 6 is a section on the line 6—6 in Figures 1 and 3.
Figure 7:
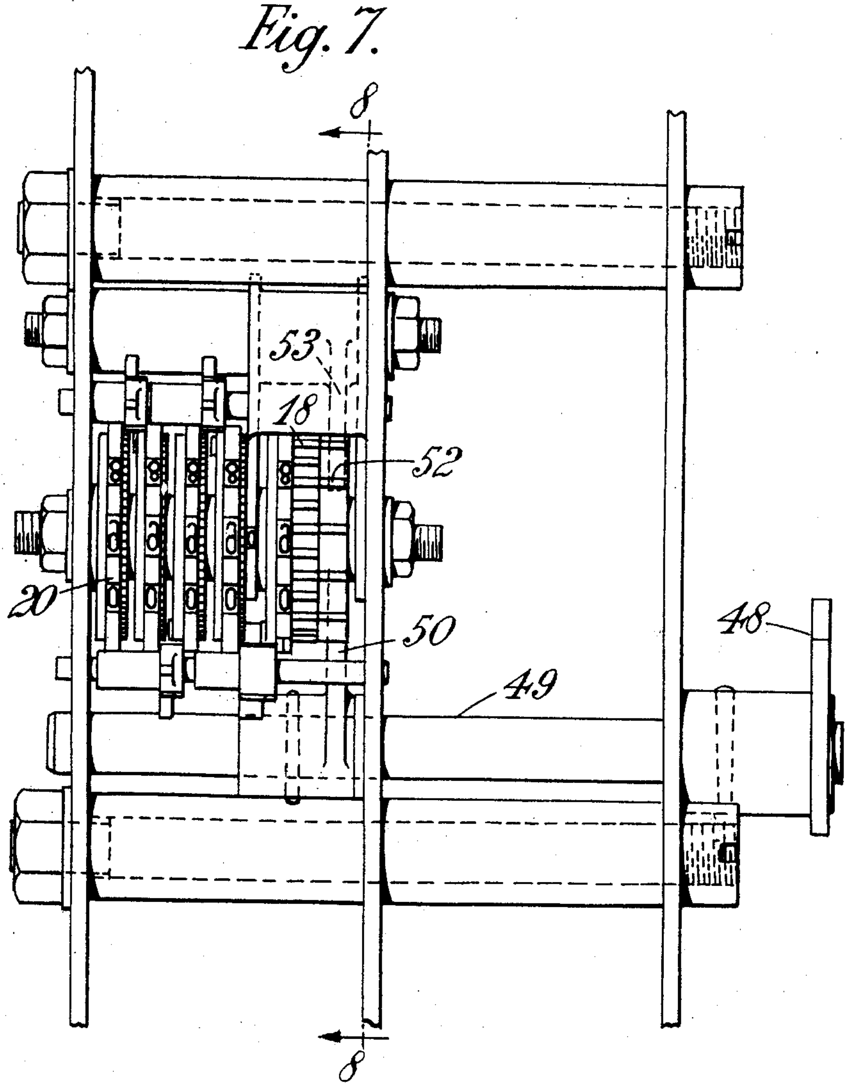
Figure 8:
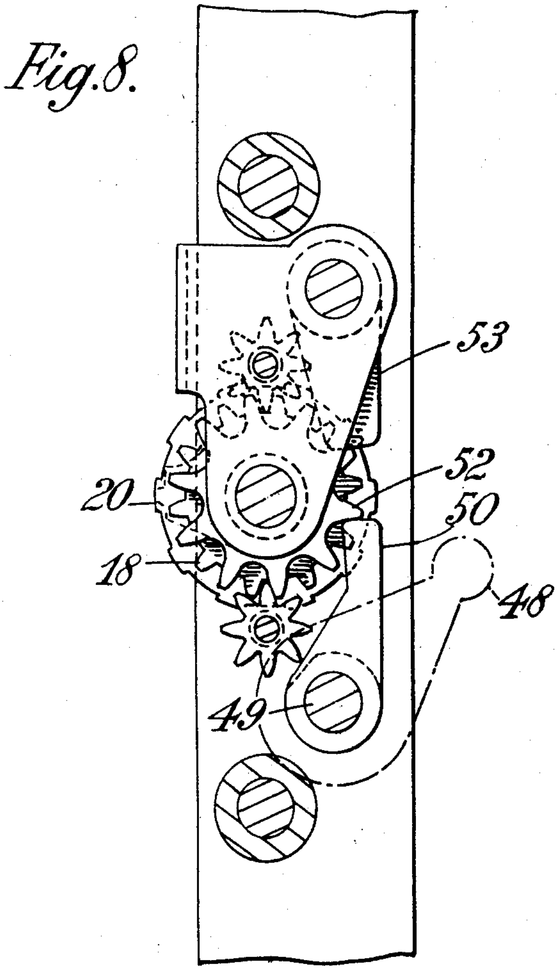
Figure 9:
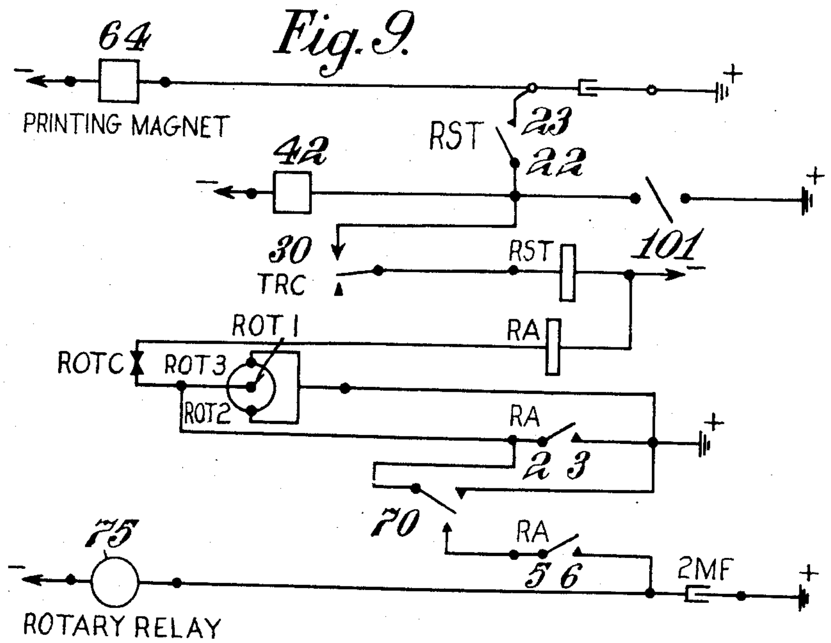
Figure 10:
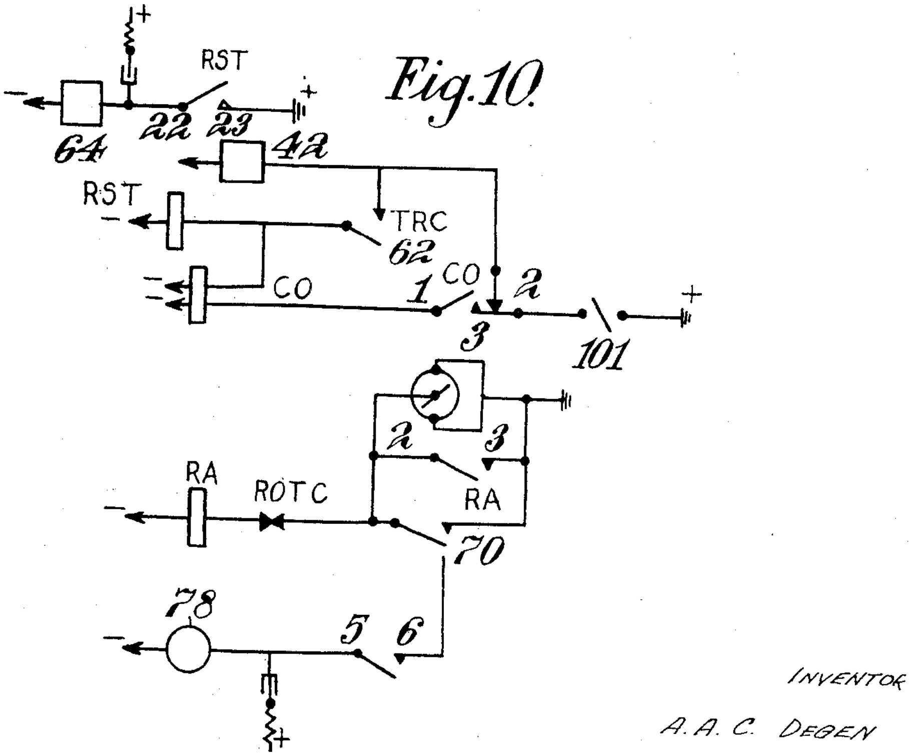
Figure 11:
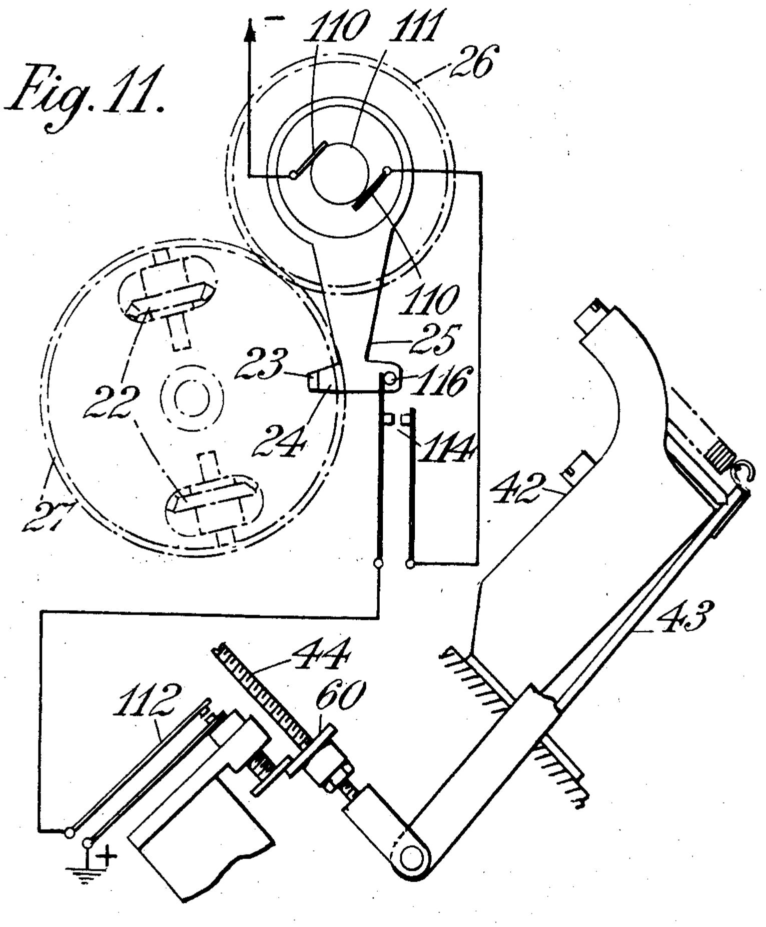
Figures 12, 13:
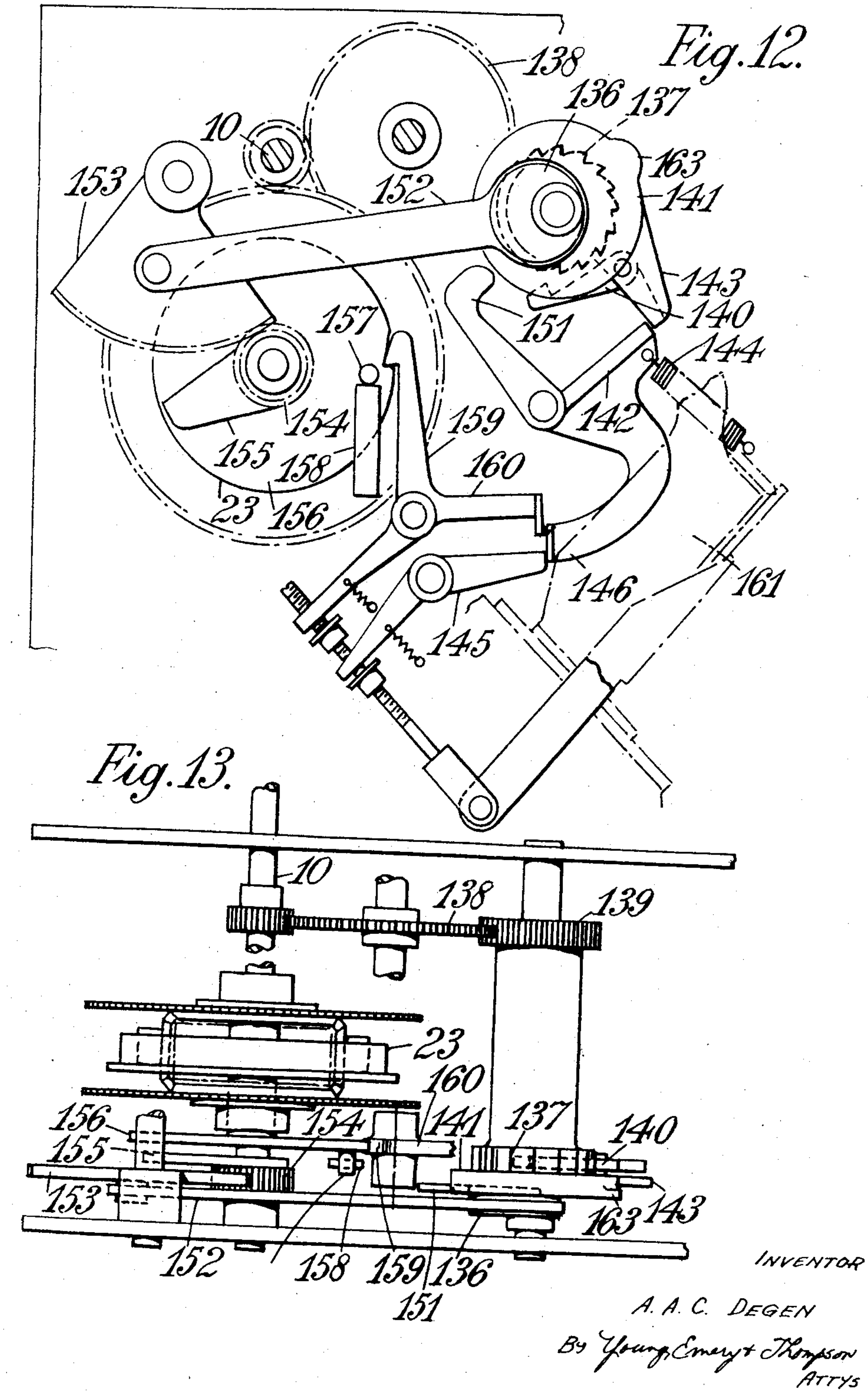

Figure 7 is a view corresponding to Figure 6 but to a larger scale showing the printing counter and some related parts, Figure 8 is a view in the direction 8—8 in Figure 7, Figure 9 is a diagram of the electrical circuit, Figure 10 is a diagram of a modified electrical circuit, Figure 11 is a view, corresponding to Figure 5, showing an alternative form of clutch which may be employed, Figure 12 is a view, also corresponding to Figure 5, showing another alternative construction and Figure 13 is a plan view of the construction shown in Figure 12.

The machine forming the subject of this example is constructed to record, on a paper web, the readings of a continuously driven counter when electrical impulses corresponding to specific events, are received. For example the printed counter readings may represent time intervals from a datum at which the events occur or in the automatic calibration of an electronic instrument the counter may be driven in synchronism with rotation of the dials of the instrument so that the counter readings represent settings of the dials which are reproducible from the readings and the impulses may be arranged to occur as specific frequencies are reached during rotation of the dials so that settings of the dials corresponding to the specific frequencies are automatically recorded for reproduction.

The machine comprises, essentially, a counter having type figures, means for feeding a paper web past the counter, means for pressing the web against the counter figures with an interleaved printing ribbon to print the counter reading on the web, continuously operable driving means for the counter which include a storage device permitting operation of the counter to be stopped for short periods—to enable printing to be effected while the figures are stationary—while the operation of the driving means is stored for subsequent transmission to the counter, and means responsive to an electrical impulse for stopping the counter and bringing the storage device into operation, for operating the printing means, for releasing the counter for operation by the driving means and the storage device and for advancing the paper web one step after each printing operation. Means are also included for advancing the printing ribbon.

The drive to the counter and the storage device will first be described. The machine has a main driving shaft 10 which is continuously rotated by an electric motor or other driving member, which is not shown. When the machine is used for calibrating an electronic instrument as above described, the shaft is rotated in synchronism with the dials of the instrument. The shaft has a gear 12 which meshes with and drives a gear 14 to which is secured one of the sun-wheels 15 of a differential epicyclic gear mechanism. The other sun-wheel 16 is fixed to a gear 17 which drives pinion 18 of the units wheel 19 of the printing counter 20.

The drive between the sun-wheels 15 and 16 of the differential gear mechanism is through two planetary pinions 22 mounted on a carrier 23 which is normally held from rotation from its "home" position by means of a dog 24 which enters into a notch in the periphery of the carrier, the carrier constituting the reaction member of the gear mechanism. The dog 24 is carried on an arm 25 which is secured to a gear-wheel 26 which meshes with gear teeth 27 on the outer circumference of the planet carrier 23.

When the carrier 23 is held locked by the dog 24, the drive from shaft 10 is directly communicated to the units wheel of the counter through the gear train 12, 14, sun-wheel 15, planetary pinions 22, sun-wheel 16 and gears 17, 18.

Gear wheel 26 with the arm 25 and dog 24 are secured to a disc 30 which forms the driven member of a slipping friction clutch. The driving member of the clutch consists of a disc 32 which is pressed against the disc 30 by a spring 33. The disc 32 may be withdrawn from the disc 30 by a fork 34 on a shaft 35 rotatable by a lever arm 36. The disc 32 is driven from the main shaft 10 by a gear (not shown) which meshes with gear 38 attached to the disc, the direction of rotation being clockwise as viewed in Figure 5. The drive through the clutch normally operates to hold the dog 24 in engagement with the planet carrier.

Secured to the casing 40 of the machine there is an electro-magnet 42 of which the armature 43 is coupled to a trip rod 44. A pair of collars 45, 46, adjustable on the rod 44 to embrace the end of a lever 48 secured to a shaft 49 on which is mounted a locking pawl 50 which is arranged to engage between teeth 52 (Figure 8) on a wheel secured to the units wheel of the counter, there being one tooth for each digit and the arrangement being that the pawl may lock the units wheel with any of the digits in the printing position. A pawl 53 prevents reverse movement of the units wheel. A further collar 54, adjustable on the rod 44 is arranged to engage the end of the lever arm 36 to effect disengagement of the friction clutch members 32, 30 when the electro-magnet 42 is energised.

Figure 1:
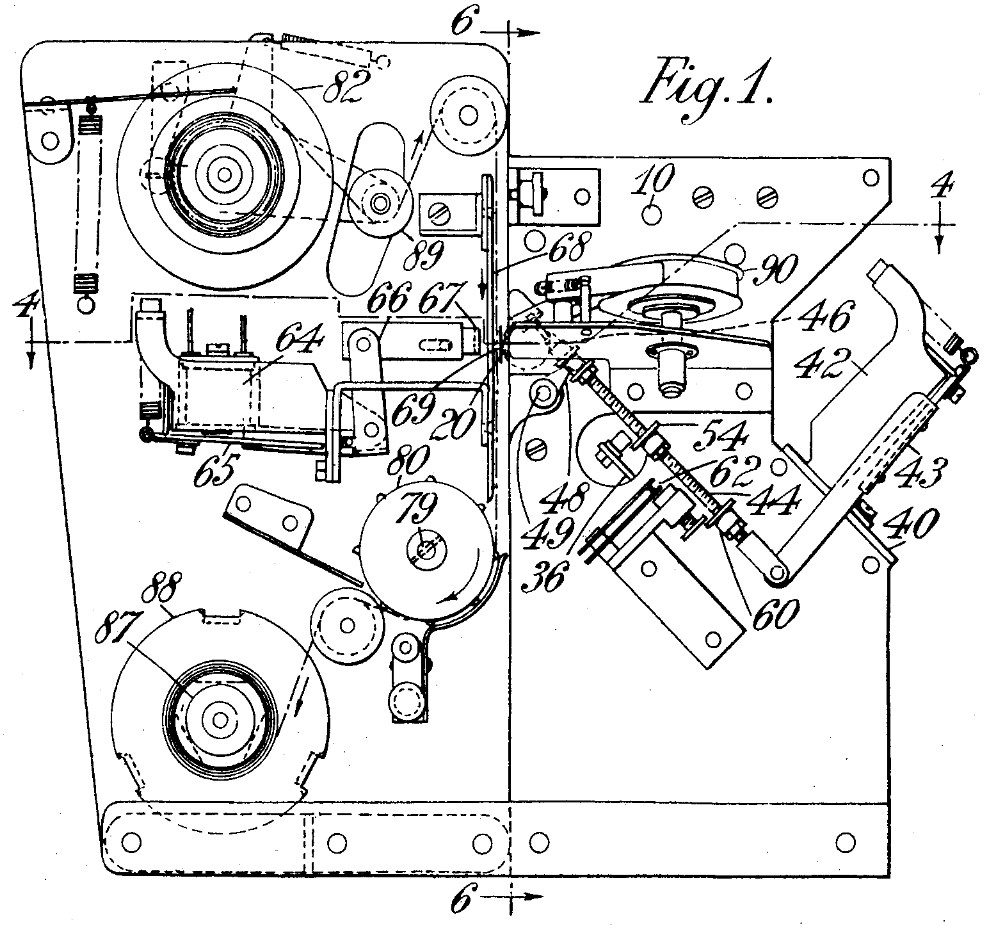
Figure 1 is a front elevation of the machine.
Figure 2:
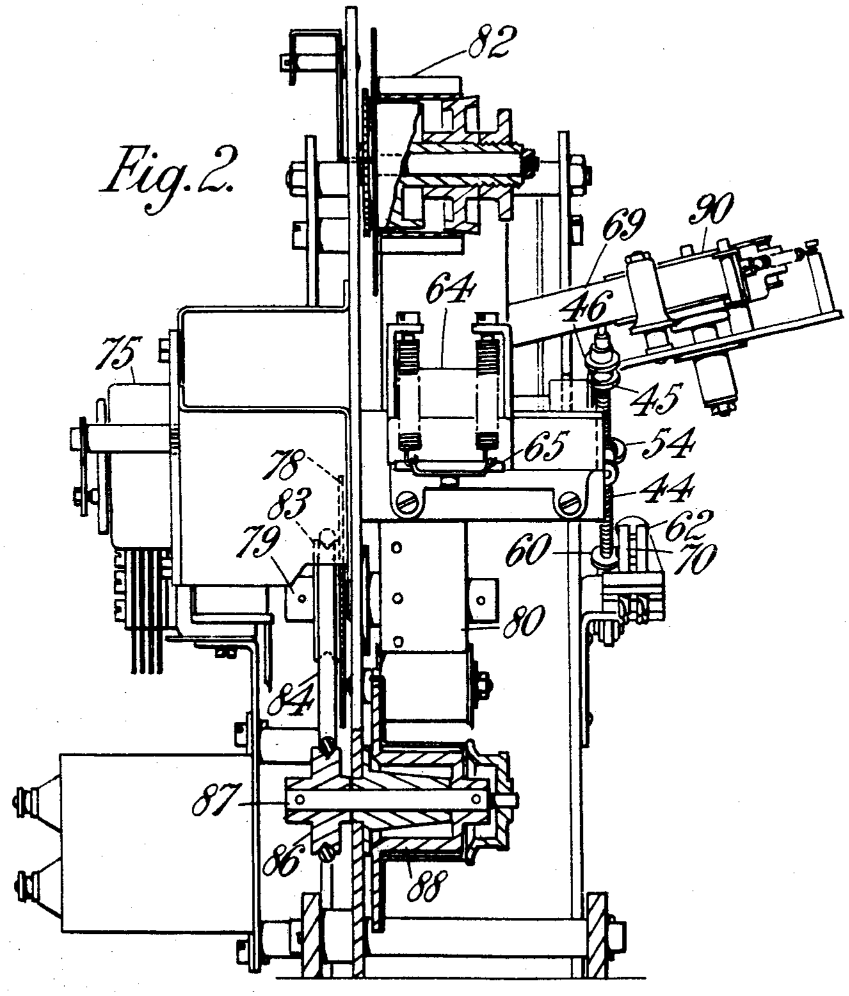
Figure 2 is a side elevation of the machine, partly in section.
Figure 3:
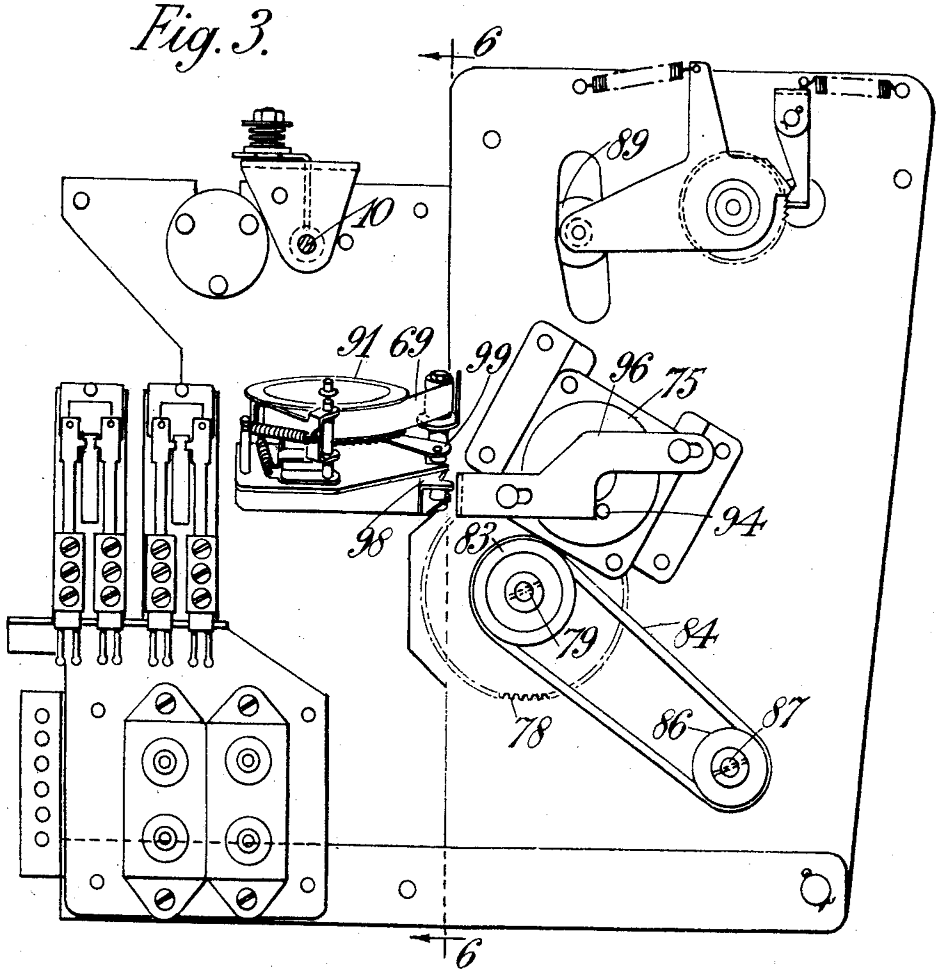
Figure 3 is a rear view of the machine.
Figure 4:
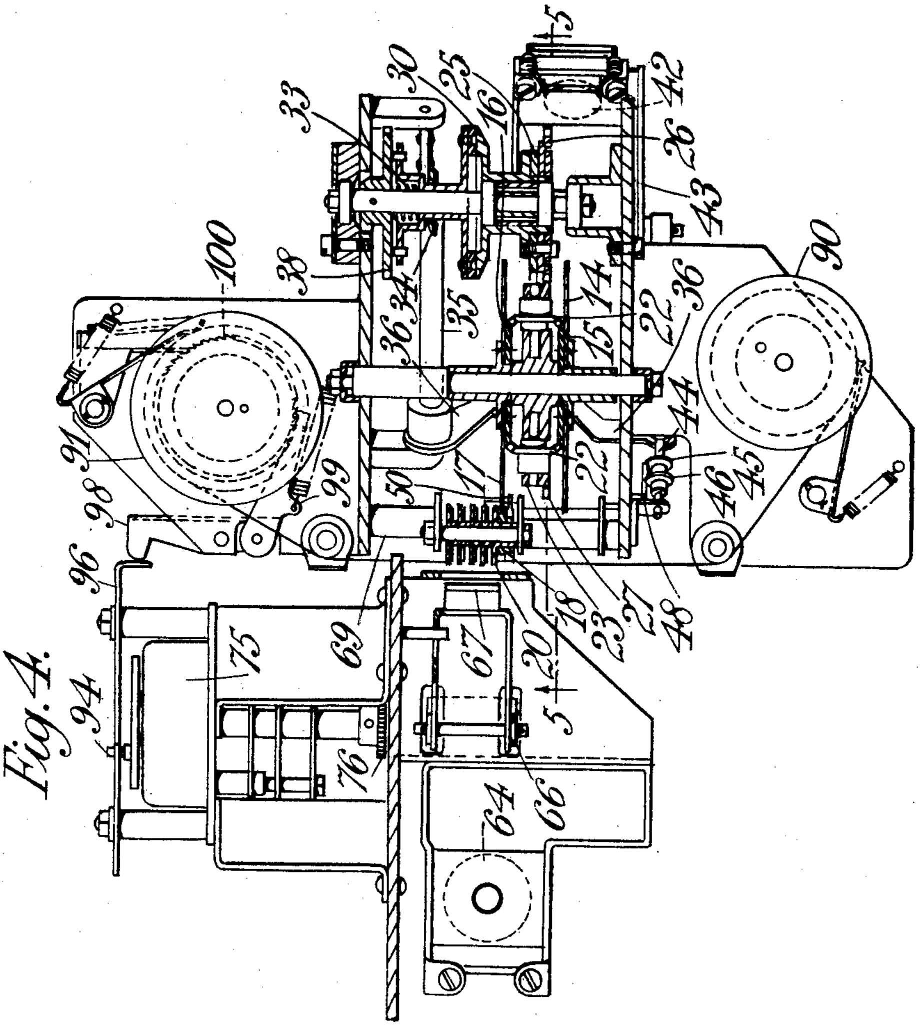
Figure 4 is a section on the line 4—4 in Figure 1.

In the operation of the machine, energisation of the electro-magnet 42 by an impulse representing an event (e.g. the attainment of a specific frequency in the application of the machine above-mentioned) to be recorded causes the armature 43 to push the rod 44 upwardly and to the left as viewed in Figure 1 which forces the locking pawl 50 into locking engagement with the teeth 52 and at the same time disengages the friction clutch by operation of lever 36. The gear wheel 26 and arm 23 are now free to rotate to withdraw the dog 24 from engagement in the planet carrier. As the unit wheel of the counter and the sun-wheel 16 are now locked and the drive from the shaft 10 continues, the planet carrier 23 tends to rotate clockwise as seen in Figure 5 which drives the gear wheel 26 to withdraw the dog 24 from the carrier. While the counter wheel is held stationary printing is effected as later described. When the electro-magnet 42 is de-energised the locking pawl 50 is released from its engagement with the teeth 52 and the counter becomes free to resume operation. At the same time the friction clutch re-engages which drives the gear-wheel 26 to re-engage the dog 24 in the planet carrier. Rotation of the gear-wheel 26 drives the planet carrier ahead of the driving sun-wheel 15 until the carrier returns to its home position and the dog re-engages when the counter will have caught up the movement lost whilst it was held stationary.

The mechanism for effecting the printing and the operation thereof will now be described. A collar 60 adjustable on the rod 44 closes a pair of contacts 62 when the electro-magnet 42 is energised. The closing of these contacts effects energisation of an electro-magnet 64 having an armature 65. Attraction of the armature rocks a lever 66 which pushes to the right (Figure 1) a platen 67 which presses the paper web 68 against the printing faces of the counter 20, there being an ink ribbon 69 interposed between the paper and the printing faces so that an impression of the counter reading is printed on the paper. The collar 60 also operates contacts 70 when the magnet 42 is energised. The purpose and effect of these contacts are described later.

The paper feed mechanism will now be described. This mechanism operates after each printing operation to advance the web to bring a fresh portion into the printing position. The feed is effected by a rotary solenoid or electro-magnet 75 of the kind which has a small oscillatory movement in response to an electrical impulse, the movement being converted by pawl and ratchet mechanism into rotational movement. The spindle of the solenoid carries a gear 76 which meshes with a gear 78 on a spindle 79 carrying a pin-wheel 80. The pins on the wheel 80 engage in marginal perforations in the paper web to draw the web from a supply reel 82 past the printing position as the wheel is rotated step by step by successive operations of the solenoid. Also secured to the spindle 79 there is a pulley 83 with a belt drive 84 to a pulley 86 on a spindle 87 carrying a wind-on reel 88. The drive to the reel permits slip as the diameter of the paper wound on the reel increases. A spring-loaded jockey pulley device 89 limits the tension on the web.

The solenoid 75 also serves to advance the ink ribbon 69. This ribbon is advanced a small step after each printing operation from a supply reel 90 to a wind-on reel 91. The ribbon moves obliquely to the paper web and the line of type (see Figure 6) in order to reduce the wear on the ribbon. To advance the ribbon, the solenoid 75 has a pin 94 which has an oscillatory movement. This pin engages a slide 96 which rocks a lever 98 carrying a pawl 99 which engages in teeth 100 on a ratchet wheel secured to the reel. Accordingly each operation of the solenoid advances the reel one ratchet tooth.

The electrical circuit is shown in Figure 9 and its operation will now be described. The electrical pulse to be recorded is fed to the circuit at 101. This effects, directly, energisation of electro-magnet 42. Closing of the contacts 62, which follows from the operation of magnet 42, effects energisation of the printing electro-magnet 64 by closing of relay contacts RST22, 23 on energisation of relay coil RST. Changing of the contacts 70 from the position shown in the diagram which is also effected by energisation of electro-magnet 42, energises relay coil RA which closes relay contacts RA2, 3 to form a self-holding circuit. At the end of the impulse, which in this example must be of duration sufficient to effect printing, the magnet 42 releases and contacts 62 and 70 return to the positions shown in the diagram. Thereupon contact 70 effects energisation of the coil of rotary solenoid 75, contacts RA5, 6 being closed by relay RA. Solenoid 75 operates to advance the paper and the ink ribbon and at the end of its movement opens contacts ROTC which releases the holding circuit of relay RA, thereby opening the contacts RA2, 3 and RA5, 6.

In order to facilitate reading of the printed records it may be desirable to separate the records into groups (say of five) by blank spaces. The diagram indicates one way in which separation into groups of five may be achieved. The rotary solenoid has a contact arm ROT1 which is rotated one twelfth of a revolution at each operation of the solenoid. Twice per revolution the arm engages contact ROT2, 3 which completes a circuit energising relay RA and so causes an extra operation of the solenoid ROT to advance the paper without a printing operation.

It is important with the construction just described that the incoming impulse be not of unduly long duration. Otherwise the counter will be held behind too long and the arm 25 will be rotated so far as to interfere with the planet carrier. A modified arrangement which permits the impulses to be of longer duration is shown in Figure 10. In this arrangement the magnet 42 operates when the impulse begins and operates contacts 62 and 70. The contacts 62 effect energisation of relay coil RST and also the coil of a slow-to-operate relay CO. The contacts RST22, 23 effect energisation of the printing magnet 64 as above described. Energisation of coil CO operates the make-before-break change-over contacts CO1, 2, 3 thereby providing a self-holding circuit through contacts CO1, 3 and de-energising magnet 42. The release of magnet 42 operates contacts 70 as above described to cause operation of the rotary solenoid. Relay CO remains energised until the impulse ends thereby preventing reoperation of magnet 42 by the same impulse.

Various other modifications may be made in the above example. Figure 11 shows one such modification in which the slipping friction clutch above described is replaced by a magnetic clutch. The clutch is energised by current supplied through brushes 110 and slip rings 111 in a circuit containing contacts 112 and 114. When the dog 24 is in holding engagement with the planet carrier 23 a pin on the arm 25 holds the contacts 114 open and the clutch is disengaged. The contacts 112 which are in series with contacts 114 are normally closed but energisation of magnet 42 causes collar 60 to open the contacts 112. Accordingly when magnet 42 is energised as above described and the counter is locked, the arm 25 is able to rotate freely to withdraw the dog from the carrier and the clutch remains disengaged when pin 116 has been withdrawn from contacts 114 and these contacts close. When, at the end of the impulse magnet 42 is de-energised contacts 112 close and the clutch becomes energised so that the drive returns the arm 25 until the dog engages the carrier and the contacts 114 are opened. If the magnetic clutch is of the friction type capable of slip, the contacts 114 may be omitted so that the clutch normally remains engaged but is disengaged when contacts 112 are opened.

In yet another modification, shown in Figures 12 and 13, the return of the planet carrier is effected by mounting alongside and parallel to the differential gearing, a crankshaft or eccentric 136 arranged to be driven by a ratchet wheel 137 which is continuously driven by the main driving shaft 10 via the gears 138, 139. A pawl 140 pivoted on a disc 141 attached to the eccentric 136 is normally held out of engagement with the ratchet wheel 137 by a lever 142, an arm 143 on the disc 141 resting against this lever and thus preventing the eccentric from rotating. When the lever 142 is withdrawn from engagement with the pawl 140 and arm 143 by a spring 144, the pawl 140 will engage with the continuously rotating ratchet wheel 137 and the eccentric will be rotated thereby. Normally the lever 142 is held in engagement with the pawl 140 and arm 143, thereby preventing this rotation, by a catch 145 co-acting with an arm 146 connected to the lever 142.

A connecting rod 152, embracing, at one end, the eccentric 136, is connected to a gear quadrant 153, which meshes with a pinion 154 connected to an arm 155 which lies against a disc 156 secured to the hub of the planet carrier, the arm being rotatable about the axis of the disc independently of the disc. The disc 156 has a pin 157 projecting from its face which is normally held in engagement with a fixed stop 158, the disc 156 and therefore the planet carrier being held from rotation by a detent 159 connected to a catch arm 160.

Upon actuation of the electro-magnet 161 which actuates a locking pawl to engage with the figure wheel pinion in a similar manner to that already described in the case of the electro-magnet 42, the catch 145 is tripped and the catch 160 is interposed against arm 146, the latter catch being slightly shorter than the former so that arm 146 will move slightly to drop onto the second catch, and at the same time detent 159 will be withdrawn from the disc 156 allowing the planet carrier to rotate anticlockwise under the action of the rotation of the main driving shaft 10.

Upon release of the electro-magnet 161, the catch 160 will be removed from the path of the arm 146 and in consequence the arm 146 will move under the action of the spring 144 and the lever 142 will be removed from the path of the pawl 140, which pawl will engage with the ratchet wheel 137 and cause the eccentric to rotate. During such rotation, a cam 163 on the disc 141 will depress an arm 151 connected to the lever 142, restoring the arm 146 under the catch 145 and positioning the lever 142 so as to re-engage the arm 143 and withdraw the pawl 140 from the ratchet wheel 137 upon completion of one rotation, thus arresting further motion of the eccentric.

During this one complete revolution of the eccentric the quadrant 155 will rotate pinion 154 and arm 155 which by engagement with the pin 157 on the disc 156 will return the latter to its normal position with the pin 157 against the fixed stop 158 and with the detent 159 re-engaged with the slot or notch in the disc.

It is not essential that the planet carrier of the epicyclic differential gear be employed, as described above, as the reaction member normally held against rotation but releasable to constitute a storage device.

I claim:

1. A machine for recording the value of a continuously changing variable on the occurrence of some event comprising a counter having count-indicating elements with type faces, continuously operable means including a rotatable driving member with a driving connection to the counter for advancing the counter in accordance with changes in the variable, printing means operable on the occurrence of the event to record the counter reading by printing from the type faces, means for stopping the advance of the counter during the recording of the reading without stopping the advancing means, and means for storing the amount of operation of the advancing means corresponding to the changes in the variable during the stoppage of the counter and for advancing the counter by an amount equivalent to the stored operation at the end of the period of stoppage in addition to the amount of the normal advance of the counter in accordance with the changing variable, said means for storing comprising an epicyclic gear train in the said driving connection, the train comprising an input member coupled to the driving member, an output member coupled to the counter and a reaction member normally held against rotation in a home position, means permitting rotation of the reaction member from the home position by the operation of the driving member during the stoppage of the counter and of the output member, and means for returning the reaction member to the home position on release of the counter for further advancement thereby to drive the output member and counter by an amount proportional to the rotation of the reaction member from the home position.

2. A machine as claimed in claim 1 in which the means for returning the reaction member to the home position comprise a driving connection from the driving member to the reaction member, said connection being additional to the drive through the input member and including a releasable clutch, and means responsive to the occurrence of an event for releasing the clutch during rotation of the reaction member from the home position.

3. A machine as claimed in claim 1 arranged for operation to make a record by an electrical impulse on the occurrence of an event and including means for completing the operation in a time period less than the duration of the impulse and for holding the machine inoperative to produce a further record during the remainder of the duration of the impulse.

4. A machine for recording the value of a continuously changing variable on the occurrence of some event comprising a counter having count-indicating elements with type faces, continuously operable means including a rotatable driving member with a driving connection to the counter for advancing the counter in accordance with changes in the variable, printing means operable on the occurrence of the event to record the counter reading by printing from the type faces, means for stopping the advance of the counter during the printing of the reading without stopping the advancing means and means for storing the amount of operation of the advancing means corresponding to the changes in the variable during the stoppage of the counter and for advancing the counter by an amount equivalent to the stored operation at the end of the period of stoppage in addition to the amount of the normal advance of the counter in accordance with the changing variable, said means for storing comprising an epicyclic gear train in the said driving connection, the train comprising an input member coupled to the driving member, an output member coupled to the counter and a reaction member normally held against rotation in a home position, means permitting rotation of the reaction member from the home position by the operation of the driving member during the stoppage of the counter and of the output member and means for returning the reaction member to the home position on release of the counter for further advancement thereby to drive the output member and counter by an amount proportional to the rotation of the reaction member from the home position, said last-named means comprising a driving connection from the driving member to the reaction member additional to the drive through the input member and including a clutch capable of slip.

5. A machine for recording the value of a continuously changing variable on the occurrence of some event comprising a counter having count-indicating elements with type faces, continuously operable means including a rotatable driving member with a driving connection to the counter for advancing the counter in accordance with changes in the variable, printing means operable on the occurrence of the event to record the counter reading by printing from the type faces, means for stopping the advance of the counter during the printing of the reading without stopping the advancing means and means for storing the amount of operation of the advancing means corresponding to the changes in the variable during the stoppage of the counter and for advancing the counter by an amount equivalent to the stored operation at the end of the period of stoppage in addition to the amount of the normal advance of the counter in accordance with the changing variable, said means for storing comprising an epicyclic gear train in the said driving connection, the train comprising an input member coupled to the driving member, an output member coupled to the counter and a reaction member normally held against rotation in a home position, means permitting rotation of the reaction member from the home position by the operation of the driving member during the stoppage of the counter and of the output member, means for returning the reaction member to the home position on release of the counter for further advancement thereby to drive the output member and counter by an amount proportional to the rotation of the reaction member from the home position, and releasable means for locating and holding the reaction member in its home position comprising a locking member interengageable in locking relation with the reaction member, and rotatable away from the reaction member out of said interengagement, and a gear drive between the reaction member and the locking member for effecting such rotation of the locking member, whereby the extent of rotation of the locking member is proportional to the amount by which the reaction member is rotated from the home position.

6. A machine as claimed in claim 5 in which the means for returning the reaction member to the home position comprise a driving connection from the driving member to the reaction member additional to the drive through the input member and including a clutch capable of slip and in which during the normal operation of the counter, the clutch slips and thereby transmits a torque which operates through the gear drive to the locking member to hold the locking member in interengagement with the reaction member.

7. A machine for recording the value of a continuously changing variable on the occurrence of some event comprising a counter having count-indicating elements with type faces, continuously operable means including a rotatable driving member with a driving connection to the counter for advancing the counter in accordance with changes in the variable, printing means operable on the occurrence of the event to record the counter reading by printing from the type faces, means for stopping the advance of the counter during the printing of the reading without stopping the advancing means and means for storing the amount of operation of the advancing means corresponding to the changes in the variable during the stoppage of the counter and for advancing the counter by an amount equivalent to the stored operation at the end of the period of stoppage in addition to the amount of the normal advance of the counter in accordance with the changing variable, said means for storing comprising an epicyclic gear train in the said driving connection, the train comprising an input member coupled to the driving member, an output member coupled to the counter and a reaction member normally held against rotation in a home position, means permitting rotation of the reaction member from the home position by the operation of the driving member during the stoppage of the counter and of the output member and means for returning the reaction member to the home position on release of the counter for further advancement thereby to drive the output member and counter by an amount proportional to the rotation of the reaction member from the home position, said last-named means comprising a returning member constrained for movement in a path in which it sweeps the path of a projection on the reaction member to engage with the projection wherever it happens to be in its path and returns the projection to the beginning of its path, which corresponds to the home position, and a driving connection from the driving member to the returning member for effecting the movement of the returning member as aforesaid.

8. A machine as claimed in claim 2 and including an electromagnet with an operable connection to the clutch to effect release thereof on energization of the magnet and means responsive to the occurrence of an event to effect energization of the magnet.

References Cited in the file of this patent

UNITED STATES PATENTS

| | | |
|---|---|---|
| 1,780,770 | Salustri et al. | Nov. 4, 1930 |
| 1,982,882 | Rhodes | Dec. 4, 1934 |
| 2,229,696 | Engst | Jan. 28, 1941 |
| 2,239,460 | Levy | Apr. 22, 1941 |
| 2,703,268 | Rixford et al. | Mar. 1, 1955 |
| 2,722,379 | Hayek | Nov. 1, 1955 |
| 2,746,318 | Benjamin | May 22, 1956 |